United States Patent
Booton

(10) Patent No.: US 6,807,264 B1
(45) Date of Patent: Oct. 19, 2004

(54) COMPUTER TELEPHONY INTEGRATION

(75) Inventor: Laurence J Booton, Ipswich (GB)

(73) Assignee: British Telecommunications public limited company, London (GB)

(*) Notice: Subject to any disclaimer, the term of this patent is extended or adjusted under 35 U.S.C. 154(b) by 0 days.

(21) Appl. No.: 09/936,310
(22) PCT Filed: Mar. 16, 2000
(86) PCT No.: PCT/GB00/00983
§ 371 (c)(1), (2), (4) Date: Sep. 12, 2001
(87) PCT Pub. No.: WO00/59194
PCT Pub. Date: Oct. 5, 2000

(30) Foreign Application Priority Data

Mar. 31, 1999 (GB) ............................................. 9907443
Jul. 6, 1999 (EP) ............................................. 99305332

(51) Int. Cl.[7] ............................................. H04M 3/42
(52) U.S. Cl. ............................ 379/201.04; 379/211.02; 379/212.01; 379/201.01; 379/201.02; 379/88.2; 379/88.19
(58) Field of Search ....................... 379/211.02, 212.01, 379/201.04, 88.2, 88.19

(56) References Cited

U.S. PATENT DOCUMENTS 5,848,131 A * 12/1998 Shaffer et al. ............. 379/88.2
6,047,054 A * 4/2000 Bayless et al. ......... 379/202.01

FOREIGN PATENT DOCUMENTS

GB 2329298 A 3/1999

* cited by examiner

Primary Examiner—Ahmad F. Matar
Assistant Examiner—Karen Le
(74) Attorney, Agent, or Firm—Nixon & Vanderhye P.C.

(57) ABSTRACT

A CTI system in which a user profile contains a call-related feature table for holding the user's chosen timeout values for the facility "Divert To Mail After Timeout". The call-related features are Name, Area Code, Time, and Route, and there is also provision for a Default value. The call-related features are ranked, and, for a incoming call to a called user, the CTI controller accesses that called user's profile, selects the highest ranking of the entries, e.g. Bob, and, using a CLI-to-name translation table, tries to find a match, i.e. is the incoming call from Bob. If there is a match, the associated timeout value is retrieved, and if there is no match, the Default timeout is retrieved. A countdown timer is started from the retrieved timeout value, and the current countdown value is displayed at the client of the called user to enable the called user to make a more informed decision about how and whether he will answer that call.

22 Claims, 7 Drawing Sheets

COMPUTER TELEPHONY INTEGRATION

This invention relates to the use of a computer for controlling the operation of a telephony system, such use is known in the art as computer telephony integration (CTI), and the systems employing such control are known as CTI systems.

As a general background, the reader will find examples of such CTI systems disclosed in the articles "Introduction to Computer Telephony Integration", by A. Catchpole, G. Crook, and D. Chesterman, British Telecommunications Engineering, Vol. 14, July 1995; "Computer Telephony Integration—The Meridian Norstar", by A. Catchpole, British Telecommunications Engineering, Vol. 14, October 1995; "Computer Telephony Integration—The Meridian 1 PBX", by P. Johnson, A. Catchpole, and L. Booton, British Telecommunications Engineering, Vol. 15, July 1998; "Callscape—Computer Telephony Integration for the Small Business", by G. Hillson, G. Hardcastle, and M. Allington, British Telecommunications Engineering, Vol. 15, January 1997, and "Call Centres Doing Business by Telephone" by M. Bonner, British Telecommunications Engineering, Vol. 13, July 1994.

Furthermore, a method is known of operating a CTI system comprising a CTI-enabled PBX, an associated CTI controller, and a plurality of user workstations, each workstation comprising a computer connected to the CTI controller and a telephone connected to the PBX In this method, the CTI controller stores respective user-associated profiles, each including a user associated workgroup containing names of users of the system, in whose telephony status the user associated with that workgroup is interested, and the PBX on receipt of an incoming call retrieves from the signalling data a dialled number (known as the Dialled Number Identification Service number (DNIS)) and the calling line identity or identification (CLI), and passes these to the CTI controller. The CTI controller translates the DNIS to a username for the called user and accesses the workgroups to find out which contain that username. The CTI controller then sends a message containing that username to each computer at which a user, whose workgroup contains that username, is currently logged on to the CTI controller. It will be appreciated that in the art, the terms log on, logon, log in and login are synonymous and interchangeable, as are the terms log off, logoff, log out and logout.

While a user is currently logged on to the CTI controller, his computer displays a respective set of icons representing the members of that user's workgroup, the icons being in the form of respective facial images, each icon) including a text display, e.g. "Free", to indicate the current telephony status of the corresponding user, and upon receipt of this message, the computers change the text display of the icon corresponding to the received user name to "Ringing". A user can answer an incoming call for a member of his workgroup by sending an answer message from his computer to the CTI controller, and the CTI controller responds by commanding the PBX to connect the incoming call to that user's telephone. This method is referred to as Distributed Office Telephony (DOT).

According to a first aspect of the present invention there is provided a method of operating a computer telephony integration (CTI) system comprising a switch and a CTI controller therefor, and a plurality of user workstations, each workstation comprising a computer connected to the CTI controller and a telephone connected to the switch, the system storing, for each user of the system, a respective user-associated profile containing at least the identity of the computer at which the associated user is currently logged on to the CTI controller, the method comprising the steps of:

responding to receipt of an incoming call at the switch by retrieve from signalling data of that incoming call a called user identity:

accessing the profile associated with the called user to retrieve the identity of the computer at which the called user is currently logged on to the CTI controller;

sending an incoming call message in respect of the called user from the CTI controller to that computer; and responding to receipt of said incoming call message at that computer by displaying an indication that an incoming call has been received for the called user; and the method being characterised by the stops of:

storing in each user-associated profile, a respective value for the length of time that an incoming call for the associated user is to be allowed to remain unanswered before routing the (call to an answering facility, said value being referred to hereafter as a countdown value;

further responding to receipt of the incoming call by retrieving said countdown value from the profile associated with that called user;

starting a call-associated countdown from the retrieved countdown value; and further responding to receipt of said incoming call message at that computer by additionally displaying the current value of said call-associated countdown.

An advantage of the present invention is that the called user can on returning to his workstation and finding that there is an incoming call for him, make a more informed decision as to whether to attempt to answer that incoming call. For example, if the user is still some distance away from his client or the telephone and sees the countdown value is, say, two or three seconds, he knows that it is unlikely that he will be able to answer the call before the countdown reaches zero, and can decide not to make a hurried attempt to answer the call, or if he does decide to try to answer that call he knows that he will have to make a hurried attempt. On the other hand, if he sees that the countdown value is, say, five seconds, then he will know that he can comfortably get to the workstation to answer the call before the countdown reaches zero.

Preferably, said call-associated countdown is performed by the CTI controller, and the CTI controller periodically sends the current value of said call-associated countdown to that computer.

Alternatively, said incoming call message includes said retrieved countdown value, and said call-associated countdown is performed by that computer.

Preferably, the profile comprises a plurality of such countdown values each having a respective priority ranking, one of said plurality being a default countdown value and having lowest priority ranking, and the or each of the remainder of said plurality being associated with a predetermined value of a respective call-related feature, and the step of retrieving said countdown value comprises the substeps of comparing information retrieved from the signalling data of that incoming call directly, or indirectly, with said predetermined value or values, and in the event of no successful comparison outcome selecting for retrieval the default countdown value, and in the event of a successful comparison outcome in respect of one or more call-related features selecting for retrieval the or a said countdown value taking into account, if necessary, priority ranking.

More preferably, a said call-related feature is calling user identity, and the CTI controller retrieves from signalling data of that incoming call a calling user identity.

Yet more preferably, the said call-related feature is a personal name, and the CTI controller retrieves a calling user identity from signalling data of that incoming call and uses a calling user identity-to-personal name translation table to obtain a corresponding personal name.

Yet more preferably, the retrieved calling user identity is a calling line identity.

The call-related feature may be geographical origin, and the CTI controller may retrieve from signalling data of that incoming call a geographical origin.

Preferably, the geographical origin feature is an area name, and the CTI controller retrieves a calling line identity from signalling data of that incoming call, extracts an area code from the calling line identity, and uses an area code-to-area name translation table to obtain a corresponding area name.

The call-related feature may be a range of times, and the CTI controller compares the time of receipt of that incoming call with said range of times.

According to a second aspect of the present invention there is provided a computer telephony integration (CTI) system comprising a switch and a CTI controller therefor, and a plurality of user workstations, each workstation comprising a computer connected to the CTI controller and a telephone connected to the switch, wherein the CTI controller comprises:

means for storing, for users of the system, respective user-associated profiles, each profile being arranged to store the identity of the computer at which the associated user is currently logged on to the CTI controller, means for retrieving from signalling data of an incoming call received at the switch a called user identity and for retrieving from the profile associated with the called user the identity of the computer at which the called user is currently logged on to the CTI controller, and means for sending an incoming call message in respect of the called user from the CTI controller to that computer; and each said computer comprises means for responding to receipt of a said incoming call message by displaying an indication that an incoming call has been received for the called user:

the system being characterised by countdown means for counting down from a received value, and being characterised in that:

the storing means is arranged to store in each profile a respective value for the length of time that an incoming call for tho associated user is to be allowed to remain unanswered before routing the call to answer facility, said value being referred to hereafter as a countdown value;

the retrieving means is also arranged to retrieve said countdown value from the profile associated with that called user;

the sending means is arranged to send the retrieved countdown value to countdown means to start a call-associated countdown; and the display means is arranged to receive from the countdown means the current value of said call-associated countdown and to display that current value.

Preferably, the CTI controller constitutes the means for starting a call associated countdown, and the CTI controller periodically sends the current value of said call-associated countdown to that computer.

Alternatively, that computer constitutes the means for starting a call-associated countdown, and the CTI controller is arranged to include said retrieved countdown value in said incoming call message.

Preferably, the profile comprises a plurality of such countdown values each having a respective priority ranking, one of said plurality being a default countdown value and having lowest priority ranking, and the or each of the remainder of said plurality being associated with a predetermined value of a respective call-related feature, and the CTI controller is arranged to compare information retrieved from the signalling data of that incoming call directly, or indirectly, with said predetermined value or values, and in the event of no successful comparison outcome to select for retrieval the default countdown value, and in the event of a successful comparison outcome in respect of one or more call-related features to select for retrieval the or a said countdown value taking into account, if necessary, priority ranking.

More preferably, a said call-related feature is calling user identity, and the CTI controller is arranged to retrieve from signalling data of that incoming call a calling user identity.

Yet more preferably, the said call-related feature is a personal name, and the CTI controller is arranged to retrieve a calling user identity from signalling data of that incoming call and to use a calling user identity-to-personal name translation table to obtain a corresponding personal name.

The CTI controller may be arranged to retrieve a calling line identity, which constitutes said calling user identity.

When the call-related feature is geographical origin, the CTI controller may be arranged to retrieve from signalling data of that incoming call a geographical origin.

Preferably, the geographical origin feature is an area name, and the CTI controller is arranged to retrieve a calling line identity from signalling data of that incoming call, to extract an area code from the calling line identity, and to use an area code-to-area name translation table to obtain a corresponding area name.

When the call-related feature is a range of times, the CTI controller may be arranged to compare the time of receipt of that incoming call with said range of times.

Preferred embodiments of apparatus and methods of the present invention will now be described by way of example with reference to the drawings, in which.

In this description the following acronyms are used:

CLI—Calling Line Indication, also known as Calling Line Identity,

CSTA—Computer Supported Telecommunications Applications,

CTI—Computer Telephony Integration,

DNIS—Dialled Number Identification Service number,

DOT—Distributed Office Telephony,

ISDN—Integrated Services Digital Network,

LAN—Local Area Network,

PBX—Private Branch Exchange,

RAM—Random Access Memory,

ROM—Read Only Memory,

VoIP—Voice over Internet Protocol.

Figure 1:
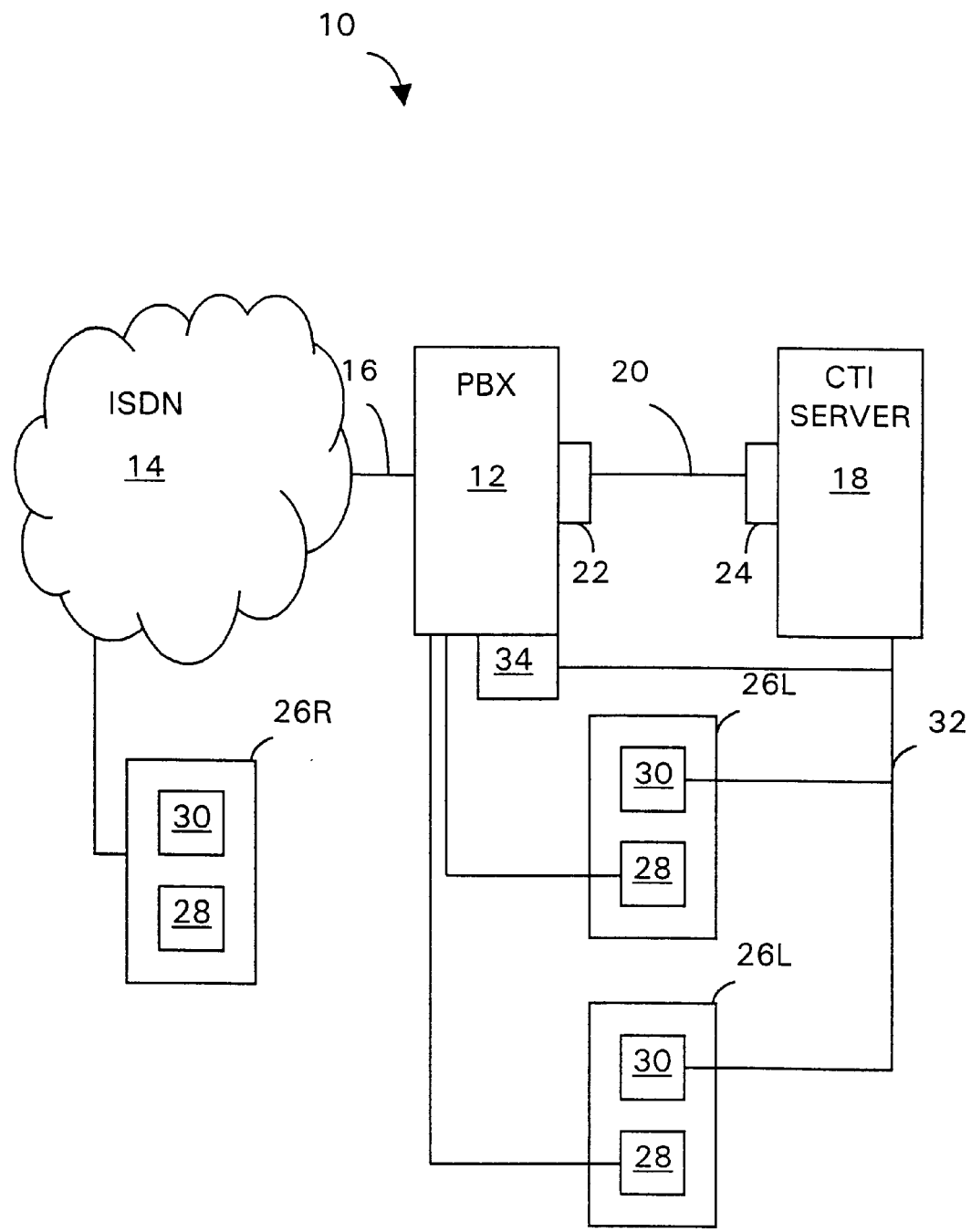
FIG. 1 is a block diagram of an apparatus of the present invention.

In FIG. 1 there is shown a CTI system 10 comprising a CTI-enabled PBX 12, constituting a switch of the present invention, connected to an ISDN 14 via an ISDN primary rate link 16, and a CTI server 18 connected to the PBX 12 via a data link 20. The PBX 12 has a CTI interface 22 which operates in accordance with the abovementioned CTI protocol, CSTA, and the CTI server 18 has a CTI interface 24 which operates in accordance with that protocol. There are a number of proprietary CTI protocols, e.g. Meridian Link from Northern Telecom, and several "open", or proposed standard, CTI protocols, including CSTA, but the performance of the present invention is not dependent upon the use of any particular CTI protocol.

The CTI system 10 also comprises a plurality of work desks, also known as workstations, 26R, situated remotely from the PBX 12, and a plurality of work desks 26L, situated locally to the PBX 12, each work desk having a respective telephone terminal 28R, 28L, referred to hereinafter as a telephone, and a respective computer terminal 30R, 30L, referred to hereinafter as a CTI client, or just client. For convenience, only one remote work desk 26R and only two local work desks 26L are shown.

The CTI server 18 and the local CTI clients 30L are directly connected to a LAN 32, and each remote CTI client 30R is indirectly connected to the LAN 32 via the ISDN 14 when a user at the respective remote work desk 26R makes a call to a predetermined destination number for access to the LAN 32. The PBX 12 receives that call and connects it to a corresponding port which is connected to the LAN 32 via an ISDN/LAN bridge 34. In this description, the terms user and workgroup member are used interchangeably and synonymously.

Figure 2:
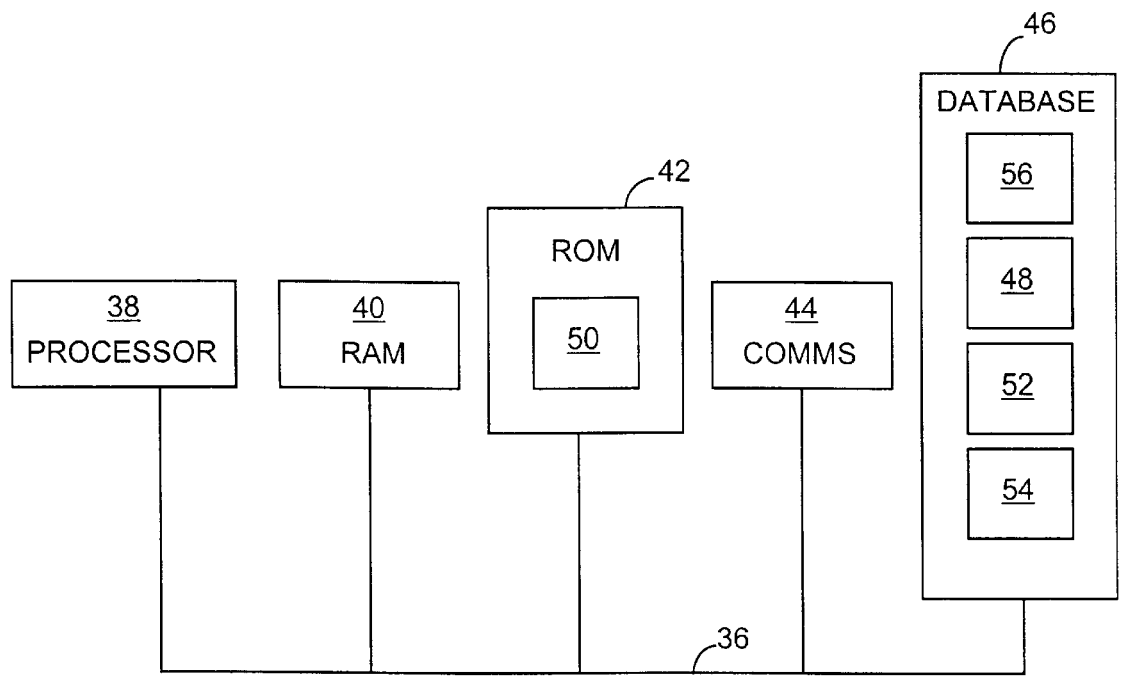
FIG. 2 shows the component parts of a CTI server of the apparatus of FIG. 1.

In FIG. 2, the CTI server 18 comprises an internal bus 36 to which is connected a processor 38, a RAM 40, a ROM 42, a data communications stack 44, and a database 46. The ROM 42 contains a conventional operating system program for controlling the processor 38, and a CTI program 50 for performing DOT functions including managing user profiles 52, and tables 54. The database 46 stores call logs 56, the user profiles 52, the tables 54, and user-associated stores 48. Each respective store 48 can, as described in more detail later, be thought of as a "Who is interested in my telephony status?" store containing the identities of other users who have included that respective user in their workgroup.

Figure 4:
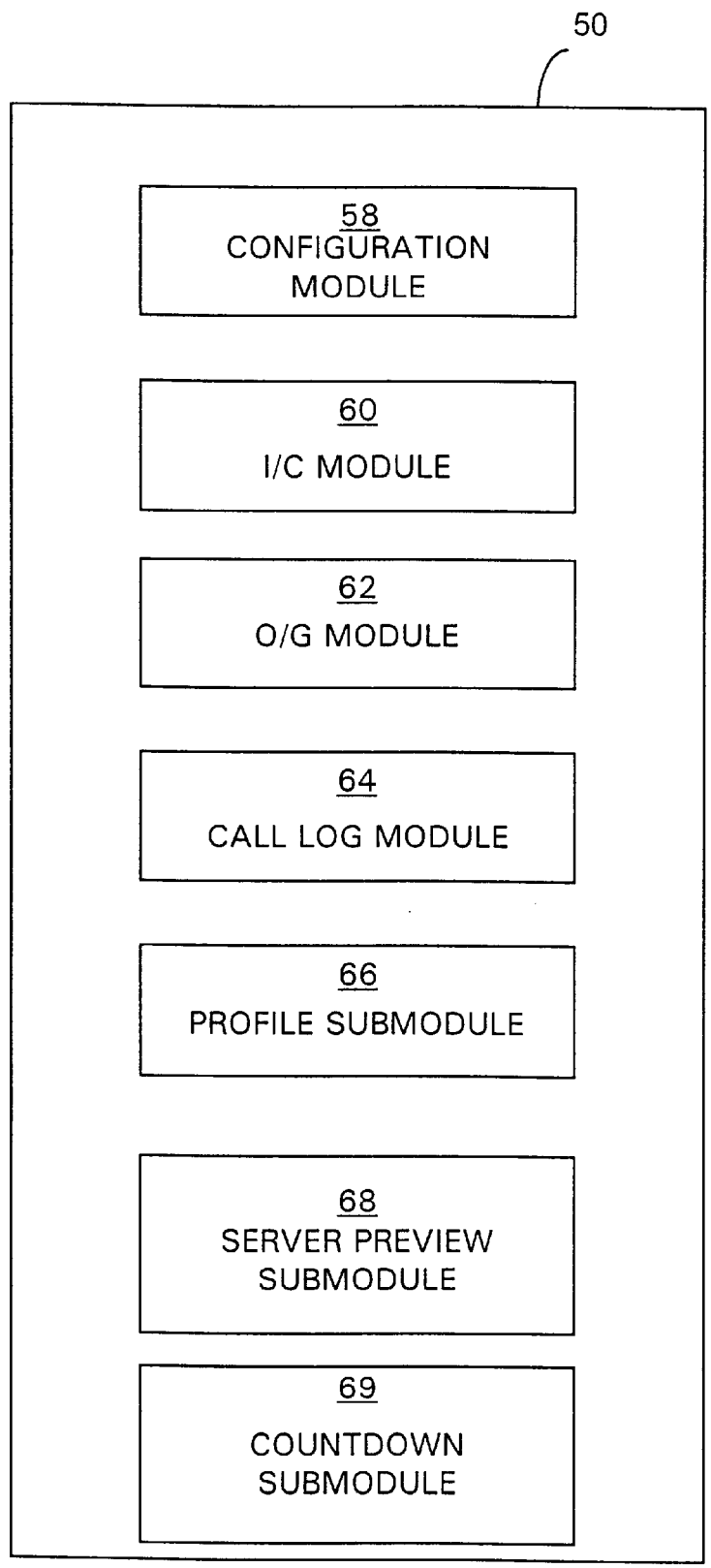
FIG. 4 shows the modules of a CTI program which controls the operation of the CTI server.

The CTI program 50, as shown in FIG. 4, comprises a number of main modules, namely a Configuration module 58, an Incoming Call module 60, an Outgoing Call module 62, and a Call Log module 64. As is known in the art, these main modules comprise submodules for performing various parts of their main function, for example, the Configuration module 58 comprises a Profile submodule 66 for managing the user profiles 52. Certain submodules which relate to known CTI functions, e.g. Display Incoming Call Details submodule, will be known to the skilled person in the art and will not be described. The functions of only those submodules relevant to the present invention will be described in detail in this description, in particular a Server Preview submodule 68 and a Server Countdown submodule 69 for performing the preferred embodiment of the present invention and which form part of the Incoming Call module 60.

Figure 6:
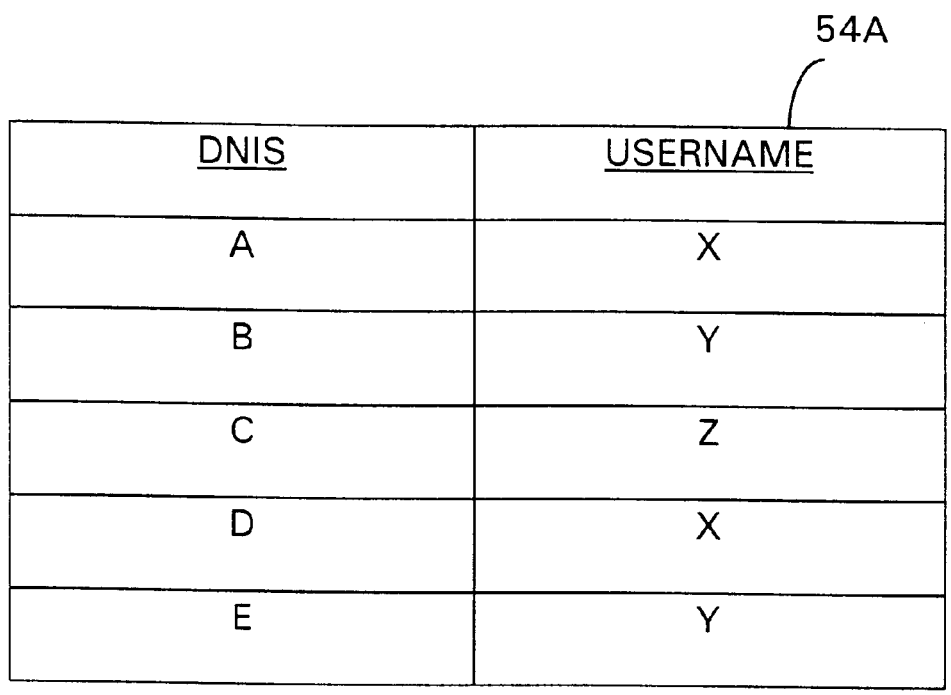
FIG. 6 shows the structure of part of a number-to-name table used by the CTI server.

Conceptually, the tables 54 stored in the database 46 are a DNIS-to-username translation table 54A (shown in FIG. 6), a CLI-to-callername translation table 54B, a calledname-to-number translation table 54C, an area code-to-name translation table 54D and respective user personal directories 54E. However, in practice, the database 46 contains just a single generic number/name translation table 54, which is used for DNIS-to-username translation, CLI-to-callername translation, calledname-to-number translation, area code-to-name translation, and the respective user personal directories. In this specification the terms caller and calling user are used synonymously, and include persons who are employees of the company owning the CTI system and who log on at a workstation of the system, and persons who, in general, are not employees and who make calls from telephones which are not extensions of the PBX. In other words, when there is an incoming call for a user of the CTI system, the caller may be another user of the system, either local and connected directly to the same PBX, or remote and connected indirectly to the PBX, or the caller may be, e.g. a customer of the company. The term called user in this specification refers to a person who is known to the CTI system and who has an associated personal profile in the set of user profiles 52.

Figure 3:
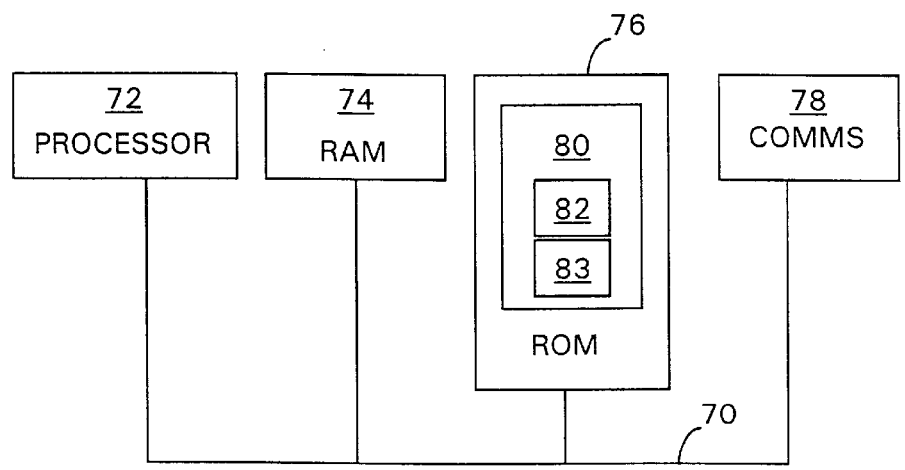
FIG. 3 shows the component parts of a CTI client of the apparatus of FIG. 1.

As shown in FIG. 3, the CTI client 30L comprises an internal bus 70 to which is connected a processor 72, a RAM 74, a ROM 76, and a data communications stack 78. The ROM 76 contains an operating system program for controlling the processor 72, and also contains a CTI program 80 for the operation of the CTI client 30L, in particular, a Client Preview module 82 and a Client Countdown module 83 for performing the preferred embodiment of the present invention.

The CTI program 80 is launched in the conventional manner, e.g. by the user clicking on an application icon on the screen of the client at which he is logged in, and CTI program 80 generates a window on the screen of the client. This window is referred to as the main DOT window, and, in addition to conventional window control icons, e.g. minimise window, it contains workgroup member icons, buttons for Dial, Configure and About, and text display for indicating the number of Missed Calls, and the number of Voice Mails. The terms Mail and VMail are used synonymously and interchangeably for Voice Mail.

The user modifies his personal profile 52 by clicking on the Configure button. The user's client sends a message to the CTI server 18, and the Configuration module 58 responds by causing a Configuration window to appear on the screen of the client. This window contains tabs for Logged In Actions, Logged Out Actions, Workgroup, My Desk, and Divert, the tab for Logged In Actions being the default selection. The user's client relays all data entries and mouse clicks to the CTI server 18, where they are received and processed by the Configuration module 58, which manages the user's profile in response, and sends return messages to the user's client, in conventional manner.

The tab pane for Logged In Actions has an upper section and a lower section. The upper section contains two radio buttons, one for Divert To Mail, and the other for Divert To Mail After Timeout, the former being offered by default. When the user selects the latter radio button, a new window opens to provide a scrollable list of items, the list comprising three columns for Type, Type Value, and Timeout Value. The user makes a right hand mouse click on Type, and obtains a drop down window containing a list of types, namely Name, CLI, Area Code, Time, and Route, these constituting call-related features of the present invention and being initially ranked in that order with Name having the highest rank. The user makes a left hand mouse click on a selected one of the types, e.g. Name. This causes Name to be entered in the first column of the first free row of the scrollable list, and the screen cursor is moved by the user to the second column of that row. The user now types in a name, e.g. Bob, moves the cursor to the third column and types a time in seconds for the timeout, e.g. 20.

If the user had selected the type CLI, he would enter a full telephone number, e.g. 0171 356 5000. If the user had selected the type Area Code, he would enter a name, e.g. Upminster, and a time in seconds, e.g. 25. If the user had selected the type Time, he would enter a range of times, e.g. 1200–1300, and a time in seconds, e.g. 15. If the user had selected the type Route, he would enter a route type, e.g. PSTN (Public Switched Telephone Network), and a time in seconds, e.g. 10. The user can make multiple entries for any of these types, and can change the rank order.

Other route types that can be selected include Inter-PBX (IPBX), and VoIP. It will be appreciated that the user need not provide entries for all the call-related features, and can choose to omit entries for some, or indeed all, of the call-related features.

The last row of the scrollable list has already been defined by the system administrator as type "Default", and the system administrator will have already preset the time in seconds to, say, 30. The user can change this preset time. Default has a predetermined rank which is lower than the lowest of the ranks of the types Name, CLI, Area Code, Time, and Route.

Figure 5:
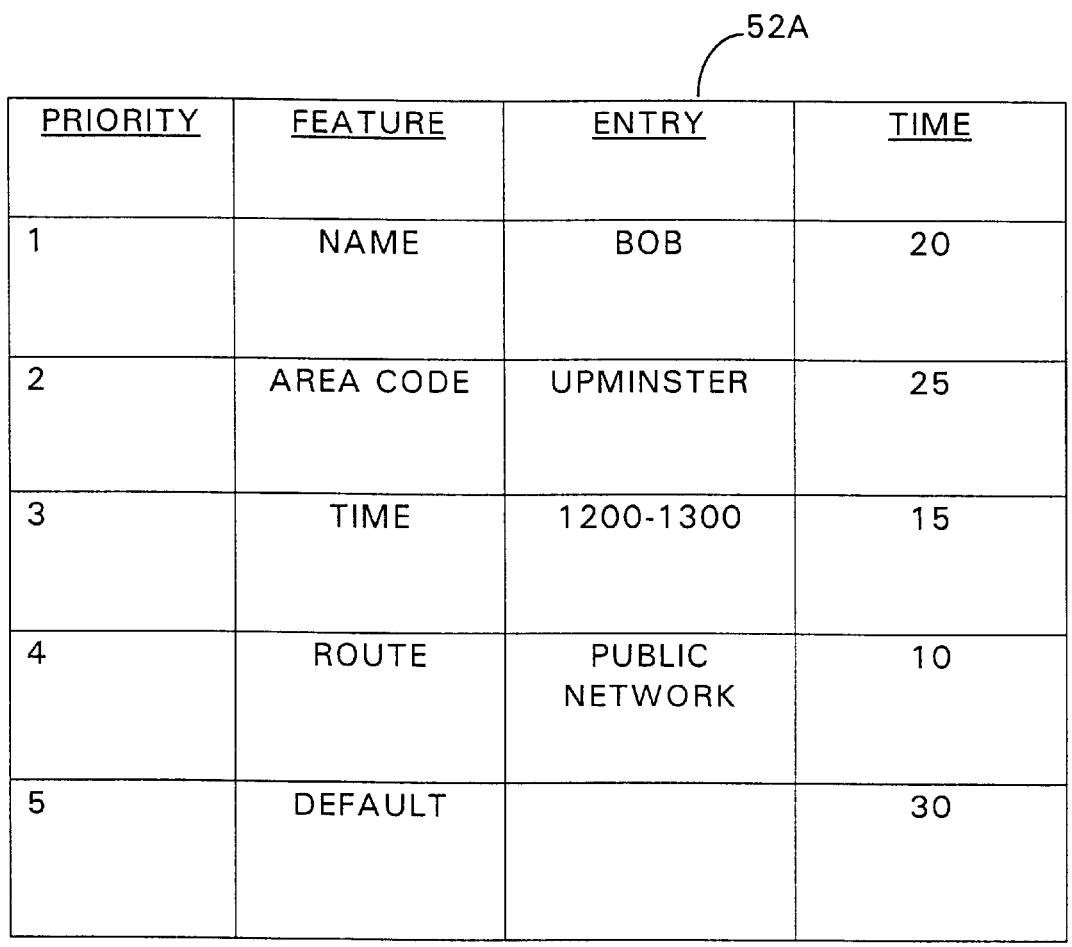
FIG. 5 shows the structure of a call-related feature table forming part of a user profile.

The data entered for Divert To Mail After Timeout is held in a table 52A, shown in FIG. 5, constituting part of the user's profile 52.

The lower section is for the entry of Additional Numbers, i.e. numbers in addition to the number of the telephone, referred to as This Desk, associated with the user's client, which will have been already entered in a Logged In Actions number list by the system administrator. This lower section contains check boxes for Home, Mobile and Other, this last being associated with a text box for the user to enter a telephone number.

In this embodiment, the user has to supply his home and mobile numbers to the system administrator for entry in the Logged In Actions number list in the user's profile. In variants, the tab pane includes an Add button which gives the user access to the number-to-name translation table 54 via an Add Logged In Target window containing text entry boxes so that he can enter his own choice of Name, Number and notes relating to that person or company, and a similar Delete button provides a Delete Logged In Target window for the user to select an entry for deletion.

The tab pane for Logged Out Actions is identical to that for Logged In Actions, and the user might select Home, Mobile and Divert To Mail After Timeout and enter the same data for the call-related features, but decide to overwrite the preset Default time with the value 40 seconds. In contrast to the Logged In Actions, the Logged Out Actions does not have a system administrator entry for the This Desk number.

The tab pane for the Workgroup facility includes a window for the user to select names from a User List, also known as a global directory, and to add these selected names to the user's workgroup, i.e. the list of people in whose telephony actions the user is interested. This workgroup contains the user's name as the default condition. For security, users are assigned a category corresponding to their principal function within a company, e.g. research, and may be assigned one or more further categories by their company administration, e.g. finance, personnel, patents, upon request and after suitable clearance. For example, research engineers may only be permitted to include "research" users in their workgroup, whereas a Head of Section may be permitted to include patents users, and a Head of Division may be permitted to include all users.

The tab pane for the My Desk facility provides a facility for the user to determine his preferred manner of Desktop Alerting. There are respective check boxes for Bring Your Desktop to the Front, and for Bring Workgroup Members Desktop to Front. The former check box relates to the user's Desktop, which is an icon in the form of a colour image of the user's face immediately above a text bar in which is indicated the user's telephony status. If the user is not logged on at a work desk 26, the CTI server 18 instructs that client to display "Free" in the telephony status bar with grey fill, i.e. background colour. If the user has logged on at a work desk 26, the CTI server 18 instructs that client to display "Free" in the telephony status bar with green fill: and when an incoming call has been received for that user, the CTI server 18 instructs that client 30 to display the callername (or "Unknown") in the telephony status bar with red fill; and when the user has answered the call, the CTI server 18 instructs that client 30 to display "Busy" in the telephony status bar with yellow fill. Each person of the User List will have a corresponding Desktop icon, though a person's icon will be blank if the administration has not yet loaded an image for that particular user. The latter check box relates to the user's personal workgroup, i.e. the set of names that the user selected using the Workgroup facility mentioned above.

The tab pane for the My Desk window also includes radio buttons for the user to select from Popup Call Window Immediately, or Popup Call Window After, and this latter radio button is associated with a text box for the user to enter the number of seconds of delay. There is also a check box for Display Call Routing Messages on Login and Logout, which is a display of either the user's currently recorded Logged In Actions or the user's currently recorded Logged Out Actions, so that if this box is checked the user will upon login see a window containing his current logged in actions, and upon logout see a window containing his current logged out actions. This option provides the user with a reminder of the current call routing actions that he has entered into his profile via the configuration facility, and if the user wishes to change the call routing actions for the following period he can do this via the configure window.

The tab pane for the Divert facility provides a facility for the user to determine whether or not to enable an overriding divert action. There are respective check boxes for Enable Divert, and for Enable Divert on Logout, and a text box for the user to enter either a telephone number or a name, e.g. Mail. The CTI server 18 has a entry in its number-to-name translation table 54 for Mail, containing the number of a Voice Mail facility, and this will have been entered by the system administrator. If the user selects Enable Divert, he will be taken out of all workgroups established by other users.

When the user launches the DOT application, the Profile submodule 66 retrieves a copy of the user's personal directory from the personal directories 54D and downloads it to the user's client. By delegating the searching of the user's personal directory to the client, the CTI server 18 is able to send a common message to the clients of all workgroup members, including the user himself.

The CTI server 18 manages a set of respective user-associated "Who is interested in my calls?" stores 48 held on the database 46, and each of these stores includes the username of its associated user by default. When the user launches the DOT application the CTI server 18 also retrieves the user's workgroup from the user's profile, and writes that user's username into respective stores 48 corresponding to the users in the workgroup. For example, if that user has the username A and has a workgroup list containing the usernames B, D and G, then the CTI server 18 will write A to the stores 48 corresponding to usernames B, D and G. When that user closes down his DOT application, the CTI server 18 deletes A from the stores 48 corresponding to usernames B, D and G.

In a variant, instead of the stores 48 there is provided a logically equivalent arrangement wherein the CTI server 18 associates a respective session data store, referred to simply as a session, with a user when that user logs on to the CTI server 18. The session contains the network identity of the client at which the user logs on, the telephone number associated with that client, and the call data of each current call associated with that user. When a call is received for a user, the Server Preview submodule 68 checks the workgroup of each user who has a current session, i.e. is logged on, and for each such workgroup that contains the identity of the called user sends a Call Received message, described below, to the user associated with such workgroup. In a further variant, the CTI server 18 maintains a list of all users who are currently logged on, also referred to as being active, and this list is referred to as the active list. Thus references to messages being sent to those members of the workgroup who are currently active encompass any of the above methods, or equivalent methods, of ascertaining which of the members are currently logged on at a client. As an example of the use of an active list, if a call is received for, say, username B, then for each entry in the active list the respective workgroup is accessed to see whether it contains the username B, and if so, then the user associated with that workgroup is sent a Call Received message in respect of the incoming call.

Figure 7A:
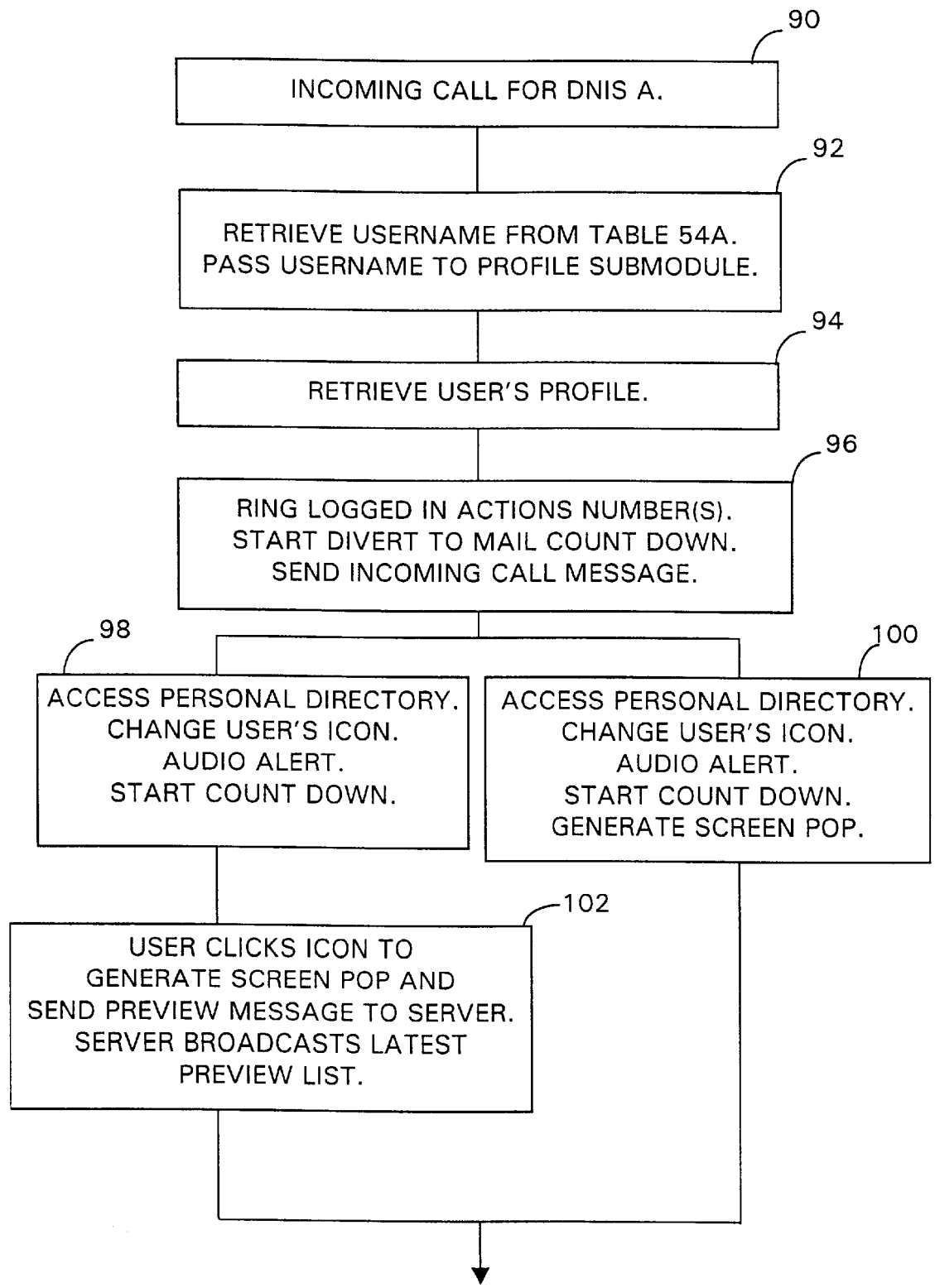
FIGS. 7A and 7B are a flow chart showing steps of a method of the present invention.
Figure 7B:
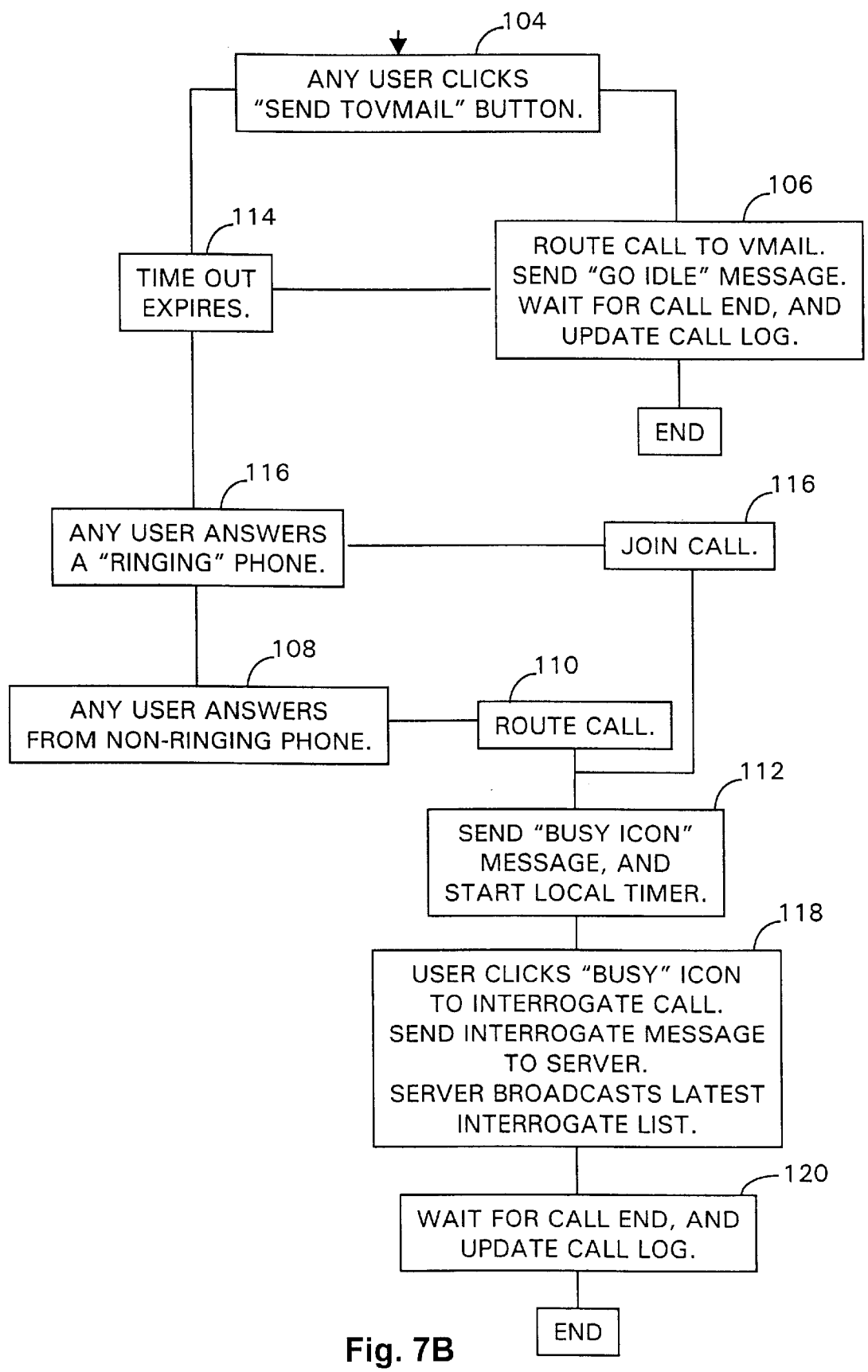

The steps of a preferred method of the present invention will now be described with reference to the flow chart of FIGS. 7A and 7B.

At step 90, the PBX 12 receives an incoming call from the ISDN 14, retrieves from the call signalling data a CLI, i.e. the telephone number of the calling terminal, constituting a caller identity of the present invention, and also a DNIS, i.e. the dialled telephone number, constituting a called user identity of the present invention, allocates a unique call ID, and passes all this data to the CTI server 18 in a Route Request message.

At step 92, the Incoming Call module 60 uses the received DNIS to access the DNIS-to-username translation table 54A (FIG. 6), retrieve a username associated with the received DNIS, and pass the username to the Profile submodule 66. Some users, e.g. those with usernames X and Y in FIG. 6, might be associated with two or more different DNISs, e.g. one for private calls, and another for business calls.

At step 94, the Profile submodule 66 uses the retrieved username to access the profiles 52 and retrieve a profile associated with the retrieved username. This profile contains the data on how that user wishes the CTI server 18 to handle the user's telephony events. A current status flag associated with the Logged In Actions and Logged Out Actions sections determines which of these two is made available to the Server Preview submodule 68. In a variant, the CTI server 18 manages a list of logged in users, which the Profile submodule 66 consults to ascertain which of the two Actions sections is to be used.

At step 96, assuming that the user is logged in, the Server Preview submodule 68 refers to the user's Logged In Actions section of the retrieved profile and commands the PBX to make a respective internal call to the or each number listed, the calls being made simultaneously when there are two or more numbers listed; and the Countdown submodule 69 also refers to the user's Logged In Actions section of the retrieved profile, selects the highest ranking call-related feature that has an entry, e.g. Bob, and tries to match this with the caller identity, using the CLI-to-callername translation table 54B, and if there is a match, loads a countdown timer with the value in that call-related feature, i.e. 20, starts the countdown timer, and passes this value to the Server Preview submodule 68. If there is no match, the Countdown submodule 69 selects the next highest ranking call-related feature that has an entry, i.e. Upminster, and tries to match this with the area code of the CLI, using the area code-to-name translation table 54D, and so on.

In this example it will be assumed that the user has not selected Home or Mobile, and has not selected Divert To Mail. In other words, the list contains only the default number for This Desk. The Server Preview submodule 68, in known manner, instructs the PBX 12 to monitor and report telephony activity at the or each such PBX extension listed in the user's Logged In Actions. Accordingly, in this example, the PBX 12 reports that it has made a call, i.e. applied ringing current, to the PBX extension for the This Desk number, and reports the PBX-allocated call ID for that call. If the user has more than one number listed in his Logged In Actions, the PBX 12 reports the respective PBX-allocated call ID for each such call. The PBX also reports the allocated call ID when it makes a call to a remote network destination, e.g. a user's telephone 28R.

Also, at step 96, the Server Preview submodule 68 retrieves contents of the store 48 associated with the retrieved username, i.e. all users recorded as having declared an interest in the telephony status of the called user, and sends a Call Received message to each of the usernames retrieved from that store 48, this message being sent to the clients where those users are currently recorded as being logged in. Hereinafter, with respect to a called user, these users are referred to as the store 48 members. This Call Received message comprises an incoming call ID; the CLI; a corresponding callername, if there is an entry in the table 54, otherwise the text Unknown; the retrieved username; the countdown timer start value; and any notes that the user has entered.

At step 98, at the clients of all the store 48 members the respective Client Preview module 82 accesses the user's downloaded personal directory using the CLI received from the Server Preview submodule 68 and checks whether the user has entered a familiar" or informal name for that CLI, i.e. a name other than a formal name held in the system-associated translation tables. Different store 48 members might have different familiar names for a given caller. If the user has no entry in his personal directory for that CLI, the Client Preview module 82 changes the telephony status bar in the called user's icon from green fill with the text "Free" to red fill with either the received callername or "Unknown" to indicate that a new call has arrived for that user. However, if there is such an entry, the Client Preview module 82 retrieves the familiar name, changes the telephony status bar in the called user's icon to red fill with the retrieved familiar name. The Client Preview module 82 also generates an audio alert via a sound card of the client; and loads a countdown timer with the received start value and starts the timer.

At step 100, at the called user's client only, the Client Preview module 82 immediately passes the countdown timer start value to a Client Countdown module 83 which responds by allocating a respective called user-associated countdown timer, loading the start value, and starting the countdown operation. The Client Preview module 82 additionally generates a screen pop bearing the title "Incoming Call For:", followed by the called username. The screen pop displays information comprising current date and time, the CLI, the familiar name (if any), the notes, and the current countdown timer value, received from .the Client Countdown module 83; and includes buttons for Answer, End Call, Send To Vmail, Apply and Dismiss, and an icon for Personal Directory. The operation of these buttons, other does those for Apply and Personal Directory, is self-evident and will not be described. The Apply button is used to send an Apply message to the CTI server 18 with any changes that the user has entered via the screen pop. For example, if neither the global directory in the CTI server 18 nor the user's personal directory yet contains an entry for the received CLI, the user can overwrite "Unknown" with a name and click on Apply. This creates an entry in the user's personal directory and sends an Apply message to the CTI server 18. Similarly, the user can update the notes and click on the Apply button. The Personal Directory button is conventional, except that when the user clicks on this button, the list of names of his personal directory appears in a window, with the entry corresponding the current CLI highlighted and thus ready for immediate selection, if there is such an entry. This facilitates situations where the user wishes to add the name and address details of a new caller by first typing the caller's name over "Unknown" and clicking on the Apply button, then clicking on the Personal Directory button, then clicking on a Select button in the personal directory window to gain access to an address part of the personal directory for the new entry. The user then types in the address details and clicks on the Apply button to effect the entry into his personal directory of the new text and to send a corresponding Apply message to the CTI server 18.

At step 102, any of the store 48 members, other than the user himself, who already has the relevant screen pop on his screen, can click on the user's icon to preview the call. This activates the Client Preview module 82 to generate an Incoming Call screen pop to be displayed on that member's screen, using the information received from the Server Preview submodule 68, and to send a Preview Call message to the Server Preview submodule 68. The Server Preview submodule 68 upon receipt of a first Preview Call message for that call ID generates a respective Preview List for that call ID, adds that member's username to the Preview List, broadcasts the Preview List to all the store 48 members, and passes the Preview List to the Call Log module 64 for storing. For subsequently received Preview Call messages for that call ID, the Server. Preview submodule 68 adds the respective members' usernames to the existing Preview List.

The clients are arranged to display the received Preview List in the Incoming Call For screen pop. In this way, when a member previews the user's incoming call, the member can see who is calling, any notes that the user has entered in his profile for that caller, who else is previewing that call, and the time left before the call is sent to Voice Mail.

In a variant, the Client Preview module 82 is arranged to start a respective local timer for each new name in a received Preview List, and to display the current value of this local timer adjacent to the displayed name. In an example of the use of this variant, a member previews a call for a user who is temporarily not at his work station, and sees that member B has been previewing for 3 seconds, member C has been previewing for 5 seconds, member D has been previewing for 10 seconds, and that the time remaining before divert to Voice Mail is 5 seconds. The newly previewing member can make the assumption that member D, on the basis of the notes and perhaps member D's own knowledge of the likelihood that the called user would want the call answered, is happy to answer the call shortly before the countdown expires; and als action to that members B and C are likely to close their screen pop and leave any further o member C.

When a member closes their screen pop, in conventional manner by clicking on a Quit button or on the standard Windows "X" close icon, their Client Preview module 82 sends a Cease Preview message to the CTI server 18, where the Server Preview submodule 68 updates the Preview List by deleting that member's username from the Preview List, and sending the updated Preview List to all the store 48 members.

Suppose that one of the store 48 members knows that the user is temporarily absent from his client, and that, upon previewing an incoming call for the user, the notes indicate that the user wishes any call from that caller to be not answered but sent to Voice Mail. That member can, with confidence that he is acting in accordance with the user's wishes, click on the Send To Voice Mail button, at step 104. The member's client sends a Send To Voice Mail message to the CTI server 18, which, at step 106, routes the call to the Voice Mail equipment, sends a Go To Idle message in respect of that call ID to all the store 48 members, and when it has received acknowledgements from all the clients, it updates the details of the call in the call log 56. When a client receives a Go To Idle message, its Client Preview module 82 changes the telephony status of the respective icon back to Free with green fill.

Suppose, as a second example, that one of the store 48 members knows that the user is temporarily absent from his client, and that, upon previewing an incoming call for the user, the notes indicate that a call from that caller is important and should be answered, if possible. That member can note the displayed countdown timer value in seconds, and wait until just before the CTI server 18 would have routed the call to the Voice Mail equipment in case the called user returns and is then available to answer the call, and then, in a step 108, click on the Answer button. That member's client sends an Answer message to the CTI server 18, which, in a step 110, routes the call to the answering member, and then, at step 112, sends a Set Icon To Busy message in respect of the answering member and a Start Local Call Timer message to all the clients, and updates the details of the call in the call log 56.

Suppose, in a variation of this second example, that several of the store 48 members have previewed the call. Each time that another member begins, or ceases, previewing the call, the CTI server 18 broadcasts an updated Preview List to all the store 48 members. Thus, a member can see which other members are previewing the call, and if, in his opinion, he is not the most appropriate of the previewing members to answer the call, he can cease previewing the call, in which case, his client sends a Cease Preview message to the CTI server 18, which then broadcasts an updated Preview List. It may be that when a member previews a call, he sees that several other members are also previewing the call, but that, while he is previewing the call, he can see their names disappear from the previewing list as they cease previewing, until only he is previewing the call. That member now knows that those other members will have seen that he was previewing the call, and that they all considered him to be a more appropriate member to answer the call.

If none of the store 48 members sends the call to Voice Mail at step 104 or answers the call at step 108, then at step 114 the countdown timer in the CTI server 18 reaches zero, also referred to as the time out expiring, and the CTI server 18 performs step 106 to route the call to the Voice Mail equipment, to instruct the clients to Go To Idle, and to update the call log 56.

If any member answers the call by picking up the handset at the alerting, i.e. ringing, telephone, this member being usually but not always the called user, then at step 116 the CTI server 18 receives a report from the PBX 12 containing, in known manner, the PBX extension number, the PBX-allocated call ID and an indication that the call is answered. The Server Preview submodule 68 now sends a Join message to the PBX 12 containing the ID of the incoming call and the ID of that answered call, and then the CTI server 18 performs step 112 to send a Set Icon To Busy message in respect of the called user and a Start Local Call Timer message to all the clients, and update the details of the call in the call log 56.

After a call has been answered by one of the store 48 members, including the user, that member's icon indicates that he is busy on a call, and any other member can, at step 118, interrogate that call by clicking on the member's icon. An Incoming Call For screen pop is displayed, but now instead of a section of the screen pop being dedicated to names of previewing members, that section now indicates the names of interrogating members; and the timer display, instead of being the countdown to Send To Voice Mail, is now the local timer count of the call duration. The client of an interrogating member sends an Interrogation message to the CTI server 18, which adds the name of that member to an Interrogation List, and broadcasts the Interrogation List to the clients of all the store 48 members.

Finally, at step 120, when the user ends the call by replacing his handset, the PBX 12 reports this to the CTI server 18, with the end time of the call. The CTI server 18 now updates the call log 56 with the end time of the call, deletes the contents of the Interrogation List, and sends a Go To Idle message in respect of that user's icon to all the store 48 members.

If the user ends the call by clicking on an End Call button on his screen, his client sends a Call Ended message to the CTI server 18, which instructs the PBX 12 to end the call. When the PBX 12 has completed that instruction, it reports this to the CTI server 18, with the end time of the call, as above, and the CTI server 18 responds in the same way.

If a user logs on, his username being thereby added to the relevant store 48, after an incoming call has been received at the PBX 12 and before it has been answered or sent to Voice Mail, the CTI server 18 sends that user's client in respect of that call all the call information including the latest broadcast Preview List, if any, but not including the countdown timer start value. In this case, if the user previews the call, he will have a display of all the usual information other than the countdown to divert.

In a variant, the CTI server 18 sends, upon user log on, a time message to synchronise the client's clock, and, in respect of any such existing call, information for enabling the client to calculate and display a countdown to divert. This information could be: the time at which divert will take place, and the client would calculate the difference between current time and "divert" time and put this difference into the countdown timer; or the time at which the call was received, together with the countdown value, and the client could calculate how much time was left, and put that into the countdown timer. Any such suitable method could be employed for obtaining the displayed countdown at a client where a user logs on after a call has been received.

In a variant, instead of displaying the caller's name in the telephony status bar against a red fill, the Client Preview module 82 displays the text "Ringing" against a red fill.

In a further variant, the Server preview submodule 68 sends the countdown timer start time only to the called user, and at the client of a previewing user the screen pop does not include the current value of a countdown timer.

Whereas the specific embodiments describe above are based on a switch in the form of a PBX, it will be appreciated that the present invention embraces other forms of switching function. For example, the switch can be a public network switch, such as a Nortel DMS100 switch which is used in known CTI arrangements in conjunction with a CompuCall CTI controller; and other forms of switching function include switches known as Automatic Call Distributor (ACD), Interactive Voice Response (IVR), and server PBX. Furthermore, the type of switching is not limited to any one form, and, in addition to switched circuit technology, includes Asynchronous Transfer Mode (ATM) switching, and Voice over Internet Protocol (VoIP) switching. With regard to this last form of switching, the switch can be a PBX having an Internet Card, or it can be a general purpose computer, e.g. one running Windows NT, having an Internet card, e.g. a Dialogic Internet card, and in this latter case the CTI controller function is provided by a program running in the computer, rather than in a separate controller. Furthermore, the telephones at the workstations can connect to their respective clients via Internet phone jacks, and in an alternative arrangement telephony can be provided for the user via a sound card in his client.

Thus, it can be seen that in general the present invention can be implemented in any computer controlled switch, by means of a suitable controlling program.

In the above specific embodiments, the called user is an individual person who normally works at a workstation. It will be appreciated that a DNIS need not correspond to an individual person, but may relate to a department or group, or a specific function within a company. Furthermore, more than one DNIS can correspond to such a function.

Similarly, the present invention includes caller identities other than the abovementioned CLI. These include a cell identity when the caller is using a mobile telephone, an alphanumeric string, an Internet Protocol address, and "null" information, e.g. where a caller has withheld his CLI.

It will also be appreciated that the term CTI, although originating from the computer control of voice telephony, is not limited to voice communications and includes other types of communications, e.g. videotelephony, and multimedia.

In the abovedescribed specific embodiments, the CTI server 18 sends a message to the computer for each of the store 48 members. In this way, the called user will get a screen pop including a "caller identity", i.e. details of the caller, immediately or after a defined time. The caller identity being typically the CLI (or a null identity if CLI is withheld) or equivalent, and any translation to a name for the caller (or Unknown if no translation is found). Each active computer, other than the called user, receives the message, but does not display the caller identity until the workgroup member clicks on the called user's icon. In a variant, only the called user is sent a message including the caller identity, and the other active computers receive a message containing only the called user identity. In this case, when a workgroup member clicks on the called user's icon, a request is sent from his computer to the CTI server 18 for a return message containing the caller identity.

Furthermore, whereas the abovedescribed specific embodiments are third party CTI arrangements, the skilled person will appreciate that the present invention is also applicable to first party CTI arrangements.

Whereas in the abovedescribed embodiments the user can divert his incoming calls to Voice Mail, it will be appreciated that the destination for the divert can be any suitable answering service.

What is claimed is:

1. A method of operating a computer telephony integration (CTI) system comprising a switch and a CTI controller therefor, and plurality of user workstations, each workstation comprising a computer connected to the CTI controller and a telephone connected to the switch, the system storing, for each user of the system, a respective user-associated profile containing at least the identity of the computer at which the associated user is currently logged on to the CTI controller, the method comprising the steps of:

responding to receipt of an incoming call at the switch by retrieve from signalling data of that incoming call a called user identity;

accessing the profile associated with the called user to retrieve the identity of the computer at which the called user is currently logged on to the CTI controller;

sending an incoming call message in respect of the called user from the CTI controller to that computer; and responding to receipt of said incoming call message at that computer by displaying an indication that an incoming call has been received for the called user; and the method being characterised by the steps of:

storing in each user-associated profile, a respective value for the length of time that an incoming call for the associated user is to be allowed to remain unanswered before routing the call to an answering facility, said value being referred to hereafter as a countdown value;

further responding to receipt of the incoming call by retrieving said countdown value from the profile associated with that called user;

starting a call-associated countdown from the retrieved countdown value; and further responding to receipt of said incoming call message at that computer by additionally displaying the current value of said call-associated countdown.

2. A method as claimed in claim 1, wherein said call-associated countdown is performed by the CTI controller, and wherein the CTI controller periodically sends the current value of said call-associated countdown to that computer.

3. A method as claimed in claim 1, wherein said incoming call message includes said retrieved countdown value, and said call-associated countdown is performed by that computer.

4. A method as claimed in claim 1, wherein the profile comprises a plurality of such countdown values each having a respective priority ranking, one of said plurality being a default countdown value and having lowest priority ranking, and the or each of the remainder of said plurality being associated with a predetermined value of a respective call-related feature, and wherein the step of retrieving said countdown value comprises the substeps of comparing information retrieved from the signalling data of that incoming call directly, or indirectly, with said predetermined value or values, and in the event of no successful comparison outcome selecting for retrieval the default countdown value, and in the event of a successful comparison outcome in respect of one or more call-related features selecting for retrieval the or a said countdown value taking into account, if necessary, priority ranking.

5. A method as claimed in claim 4, wherein a said call-related feature is caller identity, and the CTI controller retrieves from signalling data of that incoming call a caller identity.

6. A method as claimed in claim 5, wherein the said call-related feature is a name, and the CTI controller retrieves a caller identity from signalling data of that incoming call and uses a caller identity-to-name translation table to obtain a corresponding name.

7. A method as claimed in claim 5, wherein the retrieved caller identity is a calling line identity.

8. A method as claimed in claim 4, wherein a said call-related feature is geographical origin, and the CTI controller retrieves from signalling data of that incoming call a geographical origin.

9. A method as claimed in claim 8, wherein the geographical origin feature is an area name, and the CTI controller retrieves a calling line identity from signalling data of that incoming call, extracts an area code from the calling line identity, and uses an area code-to-area name translation table to obtain a corresponding area name.

10. A method as claimed in claim 4, wherein a said call-related feature is a range of times, and the CTI controller compares the time of receipt of that incoming call with said range of times.

11. A method as claimed in claim 4, wherein a said call-related feature is the type of route taken by that incoming call, and the CTI controller deduces the type of route by examination of the signalling data of that incoming call.

12. A computer telephony integration (CTI) system comprising a switch and a CTI controller therefor, and a plurality of user workstations, each workstation comprising a computer connected to the CTI controller and a telephone connected to the switch, wherein the CTI controller comprises:

means for storing, for users of the system, respective user associated profiles, each profile being arranged to store the identity of the computer at which the associated user is currently logged on to the CTI controller, means for retrieving from signalling data of an incoming call retrieved at the switch a called user identity and for retrieving from the profile associated with the called user the identity of the computer at which the called user is currently logged on to the CTI controller; and means for sending an incoming call message in respect of the called user from the CTI controller to that computer; and each said computer comprises means for responding to receipt of a said incoming call message by displaying an indication that an incoming call has been received for the called user;

the system being characterised by countdown means for counting down from a received value, and being characterised in that:

the storing means is arranged to store in each profile a respective value for the length of time that an incoming call for the associated user is to be allowed to remain unanswered before routing the call to an answering facility, said value being referred to hereafter as a countdown value;

the retrieving means is also arranged to retrieve said countdown value from the profile associated with that called user;

the sending means is arranged to send the retrieved countdown value to the countdown means to start a call-associated countdown; and the display means is arranged to receive from the countdown means the current value of said call-associated countdown and to display that current value.

13. A system as claimed in claim 12, wherein the CTI controller constitutes the countdown means, and wherein the CTI controller is arranged periodically to send the current value of said call-associated countdown to that computer.

14. A system as claimed in claim 12, wherein that computer constitutes the countdown means, and wherein the CTI controller is arranged to include said retrieved countdown value in said incoming call message.

15. A system as claimed in claim 12, wherein the profile comprises a plurality of such countdown values each having a respective priority ranking, one of said plurality being a default countdown value and having lowest priority ranking, and the or each of the remainder of said plurality being associated with a predetermined value of a respective call-related feature, and wherein the CTI controller is arranged to compare information retrieved from the signalling data of that incoming call directly, or indirectly, with said predetermined value or values, and in the event of no successful comparison outcome to select for retrieval the default countdown value, and in the event of a successful comparison outcome in respect of one or more call-related features to select for retrieval the or a said countdown value taking into account, if necessary, priority ranking.

16. A system as claimed in claim 15, wherein a said call related feature is caller identity, and the CTI controller is arranged to retrieve from signalling data of that incoming call a caller identity.

17. A system as claimed in claim 16, wherein the said call-related feature is a name, and the CTI controller is arranged to retrieve a caller identity from signalling data of that incoming call and to use a caller identity to name translation table to obtain a corresponding name.

18. A system as claimed in claim 16, wherein the CTI controller is arranged to retrieve a calling line identity, which constitutes said caller identity.

19. A system as claimed in claim 15, wherein a said call-related feature is geographical origin, and the CTI controller is arranged to retrieve from signalling data of that incoming call a geographical origin.

20. A system as claimed in claim 19, wherein the geographical origin feature is an area name, and the CTI controller is arranged to retrieve a calling line identity from signalling data of that incoming call, to extract an area code from the calling line identity, and to use an area code-to-area name translation table to obtain a corresponding area name.

21. A system as claimed in claim 15, wherein a said call-related feature is a range of times, and the CTI controller is arranged to compare the time of receipt of that incoming call with said range of times.

22. A system as claimed in claim 15, wherein a said call-related feature is the type of route taken by that incoming call, and the CTI controller is arranged to deduce the type of route by examination of the signalling data of that incoming call.

* * * * *